US008241761B2

(12) United States Patent
Garber et al.

(10) Patent No.: US 8,241,761 B2

(45) Date of Patent: Aug. 14, 2012

(54) ABRASION AND IMPACT RESISTANT COMPOSITE CASTINGS FOR WORKING IN CONDITION OF WEAR AND HIGH DYNAMIC LOADS

(76) Inventors: Mikhail Garber, Brooklyn, NY (US); Leonid Garber, Fair Lawn, NJ (US)

( * ) Notice: Subject to any disclaimer, the term of this patent is extended or adjusted under 35 U.S.C. 154(b) by 941 days.

(21) Appl. No.: 11/893,047

(22) Filed: Aug. 15, 2007

(65) Prior Publication Data

US 2009/0047543 A1 Feb. 19, 2009

(51) Int. Cl.

| | |
|---|---|
| ***B23P 9/00*** | (2006.01) |
| ***B32B 5/14*** | (2006.01) |
| ***B32B 15/18*** | (2006.01) |

(52) U.S. Cl. ........ 428/684; 428/614; 428/685; 428/687; 29/898.12; 29/898.14

(58) Field of Classification Search ........................ None
See application file for complete search history.

(56) References Cited

U.S. PATENT DOCUMENTS

| | | | | |
|---|---|---|---|---|
| 5,269,477 | A * | 12/1993 | Buchholtz et al. | 241/293 |
| 5,328,776 | A * | 7/1994 | Garber et al. | 428/614 |
| 5,337,801 | A * | 8/1994 | Materkowski | 164/98 |
| 6,033,791 | A * | 3/2000 | Smith et al. | 428/627 |
| 6,260,636 | B1 * | 7/2001 | Cooley et al. | 175/408 |
| 6,588,692 | B1 * | 7/2003 | Poncin | 241/301 |
| 7,685,907 | B2 * | 3/2010 | Nolting, Jr. | 76/107.1 |
| 2003/0146318 | A1 * | 8/2003 | Condon | 241/236 |
| 2004/0011906 | A1 * | 1/2004 | Bajadali et al. | 241/275 |
| 2004/0251358 | A1 * | 12/2004 | Condon | 241/275 |
| 2010/0143742 | A1 * | 6/2010 | Tsypine et al. | 428/600 |

* cited by examiner

*Primary Examiner* — Jennifer McNeil
*Assistant Examiner* — Jason Savage

(57) ABSTRACT

A composite casting for a wear resistant surface, comprising a base composed of a ductile material; and a plurality of wear resistant inserts embedded in said base and composed of a carbide-containing wear resistant alloy which after casting is hot strained by forging or rolling, said inserts being arranged in said base rows so that said inserts of each subsequent one of said rows overlap gaps between said inserts of a preceding one of said rows and (or) said inserts should be positioned with their side bases at a degree (relative to the movement of the abrasive material) of no less than 20°, which would prevent the wear of the ductile base of the composite castings.

20 Claims, 6 Drawing Sheets

SECTION A-A

SECTION A-A (Fig.3)

SECTION B-B (Fig.5)

SECTION A-A

SECTION B-B

ABRASION AND IMPACT RESISTANT COMPOSITE CASTINGS FOR WORKING IN CONDITION OF WEAR AND HIGH DYNAMIC LOADS

BACKGROUND OF THE INVENTION

The present invention relates to an abrasion and impact resistant composite castings for working in condition of wear and high dynamic loads.

Such composite castings must have high degree of wear resistance in combination with high ductility and impact strength. They can be used to the service life of mining and heavy construction equipment, such as bucket wheel excavators, dragline, excavators, high capacity dump trucks and crushing/milling machines.

The above mentioned equipment and its parts such as buckets of excavators, draglines, loaders, discharge throats, chutes after jaws and cone (gyratory) crushers and the like are subjected to intense abrasive wear with impact loads that cause high stresses of the surface of the parts.

Some composite castings and methods of their manufacture are disclosed in U.S. Pat. No. 5,328,776 and SU 4,061,345 and RU 308,625. In the book Garber, M. E., "Casting made of White Wear Resistant Cast Irons", Mashinostroenie, Moscow, 1972, it was shown that diminution of dimensions of carbides in casting of white irons due to acceleration of crystallization increases their wear and impact resistance. Therefore it is advisable to use different methods of comminution of carbides in wear resistance alloys, that are used for inserts of composite castings. However, when intensity impact loads reach large amounts, the service life of the composite castings with white chromium cast iron inserts do not exceed the service life of low carbon martensite steel. In the publication Katovich "Wear" 1978, V. 48, S. 35-53 it is shown that during wear the quartz sand at speed of abrasive treatment 70 m/sec and angle of attack 90° white chromium cast iron 15-3, hardness 554 Hv had a wear resistance equal to 0.6 of reference composed of carbon steel.

Low wear resistance of inserts of white chromium cast irons during wear with high stresses is caused by brittleness of carbides $Cr_7C_3$ which have a hexagonal crystal lattice with a significant difference between parameters of the lattice $\bar{a}$ and $\bar{c}$, which reaches three times.

It is also necessary to mention that acceleration of crystallization of cast irons to a certain limit diminishes the dimensions of carbides, but does not liquidate their dendritic structure, which reduces resistance to wear and impact loads.

SUMMARY OF THE INVENTION

Accordingly, it is an object of the present invention to provide a wear and impact resistant new composite castings, which avoid the disadvantages of the prior art.

In keeping with these objects and with others which will become apparent hereinafter, one feature of the present invention resides, briefly stated, a composite casting for a wear resistant surface, comprising a base composed of a ductile material; and a plurality of wear resistant inserts embedded in said base and composed of a carbide-containing wear resistant alloy which after casting is hot strained by forging or rolling, said inserts being arranged in said base in rows so that said inserts of each subsequent one of said rows overlap gaps between said inserts of a preceding one of said rows and (or) said inserts should be positioned with their side bases at a degree (relative to the movement of the abrasive material) of no less than 20°, which would prevent the wear of the ductile base of the composite castings.

In the inventive composite casting when the inserts after a casting stage are subjected to forgoing or rolling, dimensions of carbides are reduced and then dendrite structure of the carbides is eliminated or decreased.

The inserts can be made of wear resistant alloy which includes 1.80-2.80% carbon, 10.00-18.00% chromium, up to 0.60% silicon and manganese, up to 4.50% vanadium, and up to 1.50% molybdenum and tungsten.

In accordance with another feature of the present invention, for conditions of wear with high stresses on the surface of the part, the wear and impact resistant inserts are composed of a wear resistant alloy in which carbides have a crystal lattice with sizes of lattice parameters $\bar{a}$, $\bar{b}$, $\bar{c}$, that differ from one another not more than by 60%.

The inserts can be composed of wear resistant alloy which contains 1.20-3.00% carbon, up to 1.00% silicon and manganese, 4.00-8.50% chromium, up to 5.00% molybdenum, up to 6.00% tungsten, up to 10.00% of vanadium.

The composite castings which are used for protection from wear have the inserts whose cross-section in a horizontal plane have the shape of circles, squares, rectangles, triangles, clovers, or another shape and are arranged in a composite casting so that each subsequent row of the inserts overlaps spaces between the inserts of a preceding row and (or) said inserts should be positioned with their side bases at a degree (relative to the movement of the abrasive material) of no less than 20°, which would prevent the wear of the ductile base of the composite castings.

The base of the composite castings is composed of a ductile material. One of such materials is low carbon steel, that reliably retains inserts and, by means of welding, is reliably held in a part to be protected.

Another material of the base can be low carbon martensite steel, that after hardening, has a hardness not less than 40 Rc, which increases the service life of the composite castings.

For some applications the base can be composed of austenitic manganese steel which contains not more than 1.30% carbon, not more 0.80% silicon, up to 14.00% manganese, not more 3.00% chromium, not more than 0.70% vanadium, and not more than 1.50% molybdenum.

In order to simplify the manufacturing and provide a more lightweight construction of the composite casting, the base is composed of aluminum or magnesium alloys with strips, or angle pieces of low carbon steel. The strips or angle pieces have bulges (tongues), that are embedded the base for joining the strips or angle pieces with the base.

Some aluminum alloys have strength which is not lower than the strength of low carbon steel. A specific weight which is lower at least three times allows to reduce the weight of the composite casting and the article protected by it. This allows to reduce energy consumption of an equipment, for example excavators, loaders, dump trucks, etc.

A significantly lower temperature of melting of such alloys when compared with steel allows to simplify the technology of manufacture of the composite castings. It is not necessary to harden the whole composite casting, but instead only inserts can be hardened which constitute approximately 30% of the whole volume of the casting.

Casting of inserts with an aluminum alloy at a temperature of about 1,230° F. and especially in metal mold allows to obtain the inserts with high hardness after casting with this alloy. Labor and energy expenses for melting, molding, dressing, shaking out and fettling of composite castings are reduced and the surface of the castings is improved.

The strips or angles provided in the castings make possible to reliably weld the castings to the parts to be protected. Due to good flowability and possibility of overheating of aluminum alloys in a composite casting it is possible to accommodate more inserts, which increases resistance of the parts to be protected.

The ductile base could be made from either rubber or polyurethane for the reduction of wear from impact loads of abrasive material.

As a rule, composite castings are made as plates with a size 8"×10"×1-2". However, if it is necessary to protect larger surfaces and to reduce labor consumption of mounting and welding, such plates can be cast in form of blocks which are composed of plates. The plates are connected with one another by partitions from the base material and arranged on the block so that the partitions which connect the plates are overlapped by the plates of a next row, to provide protection of the partitions from wear.

For more reliable connection of inserts with the base, the insert should have a conical shape in which the larger base of the insert is embedded in the base of the composite casting.

Another method for improving the connections of the inserts with the base is the use of inserts that have recesses or ribs on their side surfaces.

In accordance with still another embodiment the firm connection of the inserts with the base can be provided by coating of the inserts, before an arrangement in a mold, with a layer of copper or nickel or both, which allows to provide brazed joints of the inserts with the base.

The composite castings in form of plates or blocks of plates can be fixed to a surface to be protected by means of welding of the surface with the steel base plates.

When the composite castings have the base composed of aluminum or magnesium alloys, a reliable connection to a part to be protected can be provided by welding strips or angles of low carbon steel, that firmly connects during the casting process, with the base since bulges of the strips or angles are embedded in the base.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
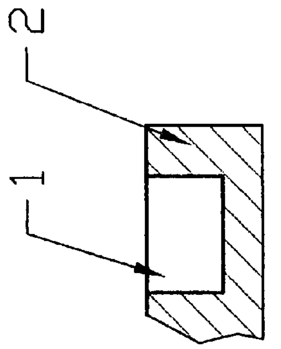
FIG. 2 is a view showing a section of the composite casting along the line A-A in FIG. 1.
Figure 1:
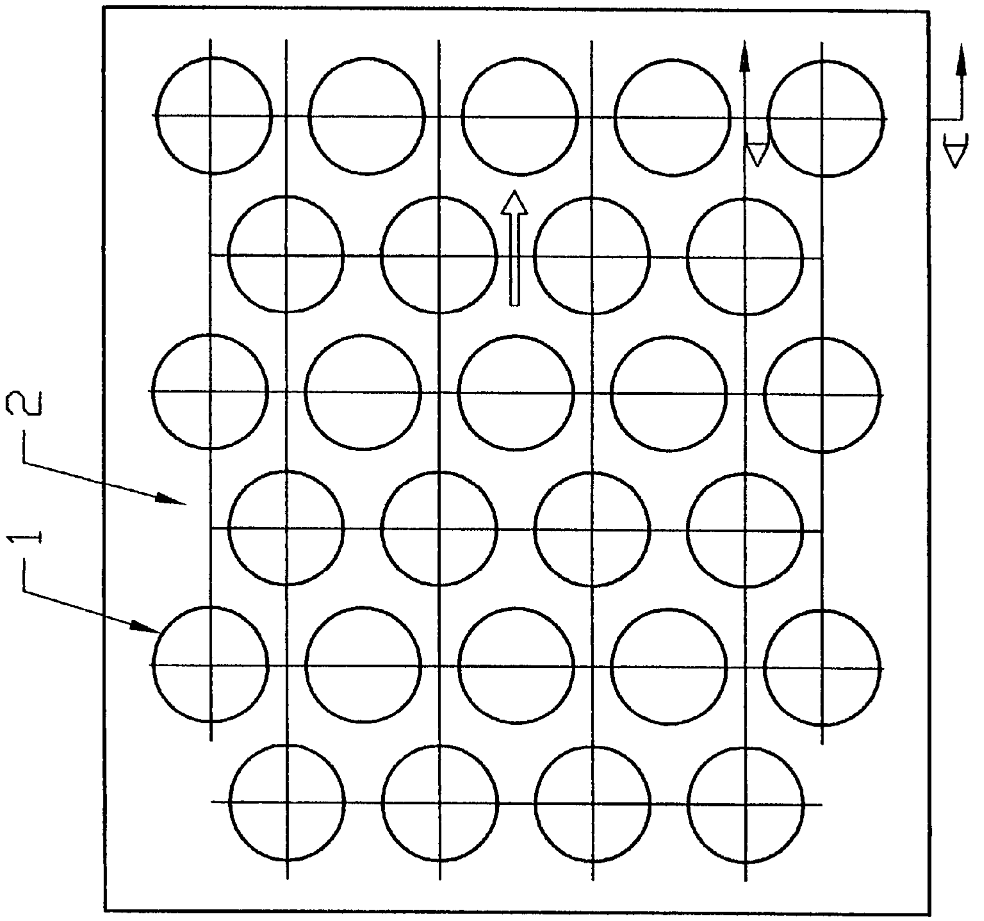
FIG. 1 is a view showing a plan view of a composite casting in accordance with the present invention.
Figure 4:
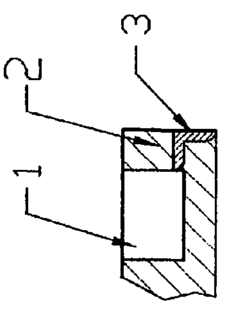
FIG. 4 is a view showing a section of a composite casting taken along the line B-B in FIG. 3.
Figure 6:
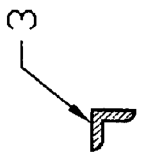
FIG. 6 is a view showing a section of the casting of FIG. 5 taken along the line B-B.
Figure 3:
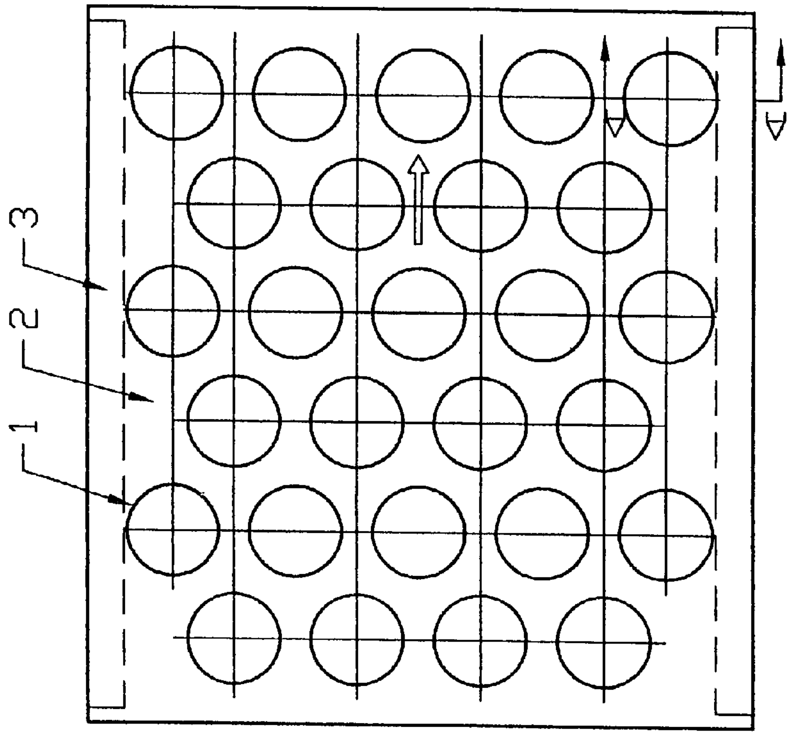
FIG. 3 is a plan view of the composite casting with a base composed of aluminum or magnesium alloy.
Figure 5:
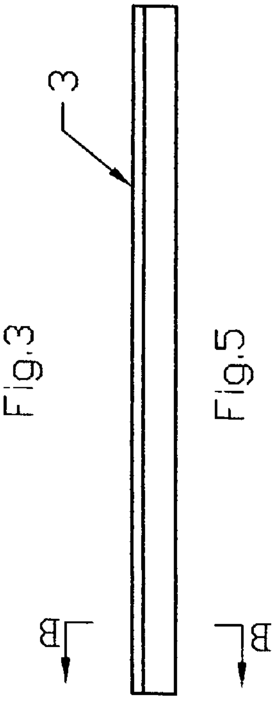
FIG. 5 is a view showing a steel angle with bulges inserted in and bonded to a base of the casting.
Figure 7A:
FIG. 7 is a view showing a block of wear resistant plates.
Figure 7B:
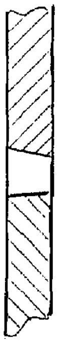
Figure 7:
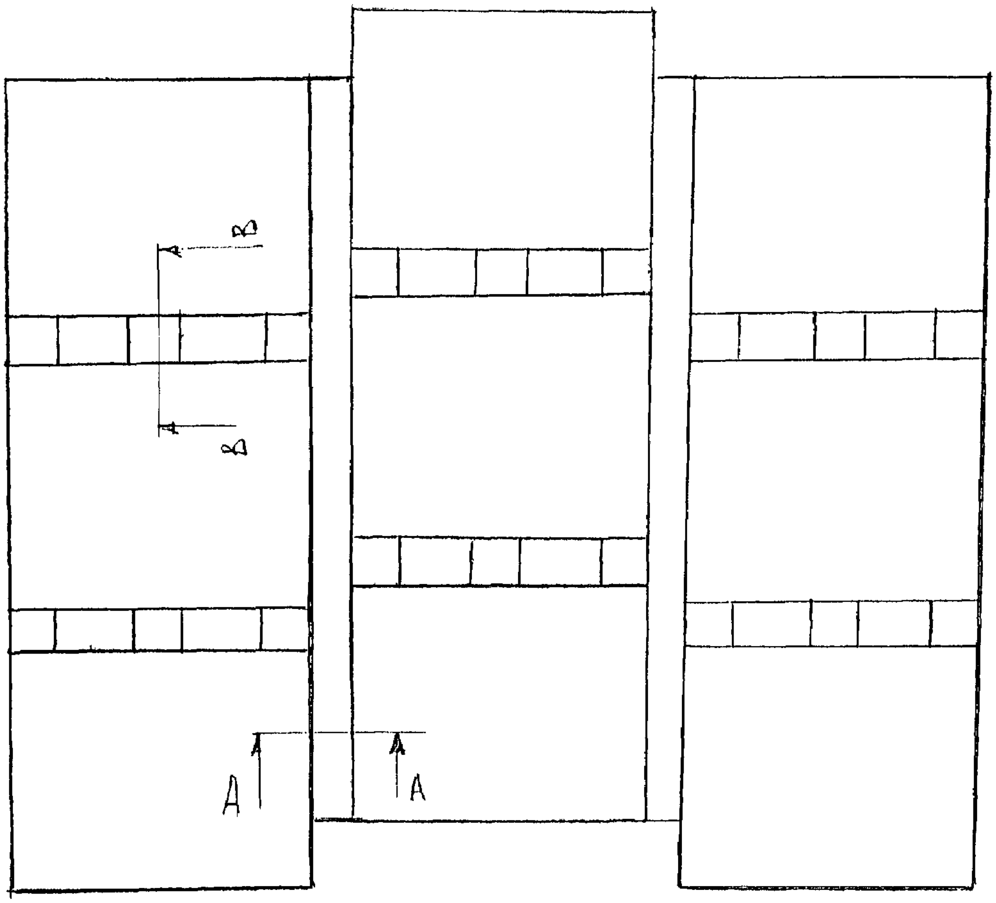

A composite casting in accordance with the present invention has a plurality of wear resistant elements or inserts 1, and a matrix or base 2, in which they are embedded as shown in FIGS. 1 and 2.

The wear resistant elements protect a working surface of an equipment from abrasive wear, while the ductile matrix retained the wear resistant materials in the casting to increase impact strength of the wear resistant elements due to dampening and confining effects.

In order to increase the wear and impact resistance of the inserts or the wear resistant elements in condition of strong impacts and resulting high stresses on the surface, they are composed of wear resistant alloys in which carbides are significantly comminuted and the dendrite structure of carbides is liquidated or significantly diminished. This has been achieved in that the wear resistant elements or inserts are composed of a carbide-containing wear resistant alloy, which after casting are subjected to forging or rolling, that allow due to hot deformation or strain to comminute carbides and to liquidate or considerably diminish their dendrite structure. Wear resistant alloys that are subjected to such treatment have higher wear resistance in condition of high wear and impact loads.

For operation of equipment with medium-striking impact loads, for producing inserts forging or rolling of carbide alloys is utilized, that contain 1.80-2.80% carbon, 10.00-18.00% chromium, up to 0.60% of silicon and manganese, up to 4.50% of vanadium, and up to 1.50% of molybdenum and tungsten.

For conditions of wear with high stresses on the surface of the parts to be protected, the wear and impact resistant inserts are composed of wear resistant alloys in which carbides have a crystal lattice with sizes of parameters a, b, c, in the lattice that differ from one another not more than by 60%. The carbides of this type have a high resistance to wear with high stresses.

For the operation of equipment with high striking impact loads, wear resistant inserts are composed of alloy containing 1.20-3.00% carbon, up to 1.00% silicon and manganese, 4.00-8.50% chromium, up to 5.00% molybdenum, up to 6.00% tungsten, up to 10.00% of vanadium.

The matrix or base of the composite casting in accordance with the present invention is composed of ductile steels such as low carbon steels, low carbon martensite steel, manganese austenite steel (Hatfield), aluminum or magnesium alloys, rubber and polyurethane.

One of the important features of the present invention is the use a ductile base composed of aluminum or magnesium casting alloys.

FIGS. 3, 4, 5, 6 show a composite casting plate with a base 2 composed of aluminum alloy and with inserts 1 composed of a wear resistant alloy which is subjected after casting to forging or rolling.

In the composite castings with aluminum or magnesium alloy base also the inserts can be used after casting without subsequent forging or rolling. Such plates are connected to a part to be protected by welding or bolting.

During the manufacture of the composite castings, in a mold together with the inserts 1, steel strips or angles shown in FIGS. 3, 4, 5, 6 and identified with reference numeral 3 are installed, which have a bulge 4. After pouring of aluminum alloy into mold, the bulge 4 is embedded in the aluminum base 2 and further holds the strips or angles 3 in the composite casting. The steel strips or angles are then firmly welded in a part to be protected. When the plate castings are connected to a part to be connected by bolting, they are provided with bolt holes and in this case the steel angles or strips are not needed.

An example of a manufacturing process for making the inventive composite castings is presented herein below.

The casting is formed as a plate with a size 8"×10"×1". The base is composed of a cast steel which has 0.17-0.20% carbon, 0.17-0.37% silicon, 0.35-0.65% manganese and not more than 0.045% of sulfur and 0.04% of phosphorus.

The wear resistant elements are composed of a steel which is subjected to casting or rolling and contains 2.25% carbon, 0.45% silicon, 0.40% manganese, 11.50% chromium, 0.80% molybdenum, and 0.20 vanadium.

The wear resistant elements or inserts are made from round bars with a diameter 1.25" by cutting of the bars to make inserts with a height of 1.00 inch. The inserts are arranged by means of a special device into a lower casting mold composed of green sand, the mold is assembled and then liquid steel is filled at a temperature of 2, 758° F. After cooling and expelling the castings that are cleaned and cut off. The composite plates are thermally treated by heating to 1711-1770° F. during 1.5 hours and then cooled in a salt quenching bath.

Another example of the manufacture is provided for use in applications where stresses on the surface of the plate are very high. The inserts are composed of steel in which carbides have a crystal lattice with parameters a, b, c, that differ from one another not more than 60%. The inserts are composed of steel subjected to casting and rolling and contain 1.30% carbon, 0.30% silicon and manganese, 4.50% chromium, 4.50% molybdenum, 5.50% tungsten, 4.00% vanadium. The plates are preheated to a temperature of 1500-1550° F. during 1 hour and then heated to 2150-2250° F. during 4 hours, then the composite plates are thermally treated by heating to 2150-2250° F. during 30 minutes and cooled in warm oil, and then tempered at 1000° F. for 2 hours with a subsequent air cooling to ambient temperature.

A next example of castings in accordance with the present invention involves plates with dimensions 8"×10"×1.25". The wear resistant inserts are composed of steel subjected to casting and rolling in rods with a diameter of 1.25" and containing a 2.30% carbon, 0.40% silicon and manganese, 12.50% chromium, 1.10% molybdenum, 4.00% vanadium. The inserts are thermally treated by heating to 1900-2000° F. during 1 hour and then cooled in air.

The thermally treated inserts and low carbon steel angles by means of a template are arranged in a lower metal casting mold. After the assembly, aluminum alloy is poured into the mold. After cooling and expelling, the castings are cleaned and cut off.

In all three examples the thusly manufactured plates are fixed to a surface of parts to be protected by means of welding.

The wear resistant inserts can have a shape in a plane (cross-section) selected from the group consisting of a circle, a square, a rectangle, a triangle, a three-petal clover, as shown in FIGS. 8*a*, 8*b*, 8*c*, 8*d*, 8*e*, and located so that each subsequent row of the inserts overlaps gaps between the inserts of a preceding row.

Figure 8A:
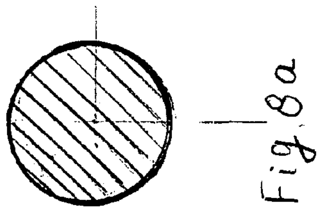
FIG. 8 is a view showing a further modifications of the insert of the inventive composite casting.
Figure 8B:
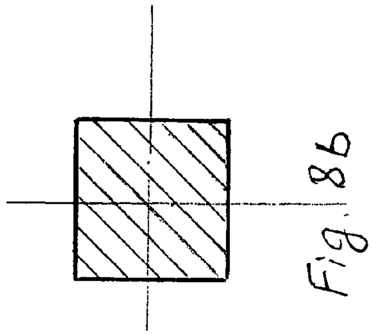
Figure 8C:
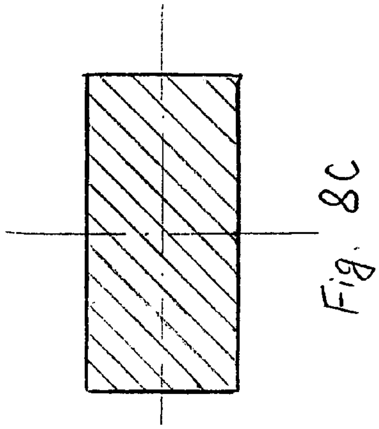
Figure 8D:
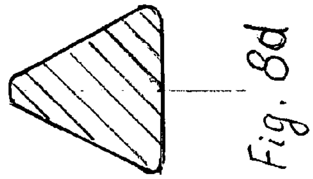
Figure 8E:
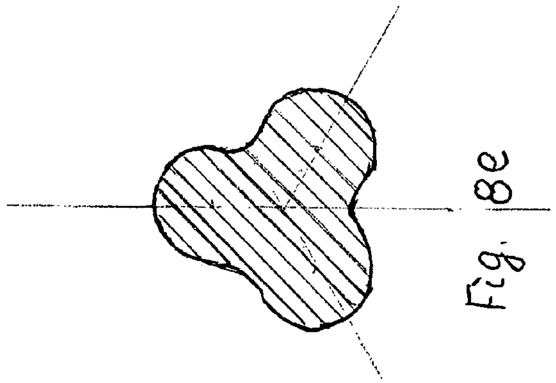
Figure 8F:
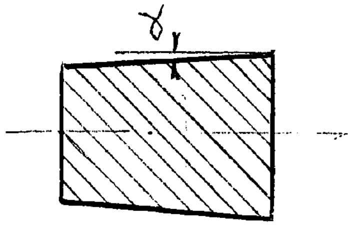

The wear resistant inserts can have a lower surface which is smaller than an upper surface as shown in FIG. 8*f*.

Figure 8G:
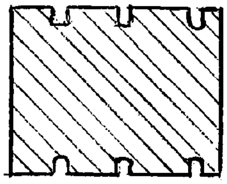
Figure 8H:
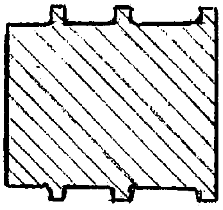

The wear resistant inserts can have side surfaces provided with a structure selected from the group consisting of a recess and a rib as shown in FIGS. 8*g* and 8*h*.

Figure 8I:
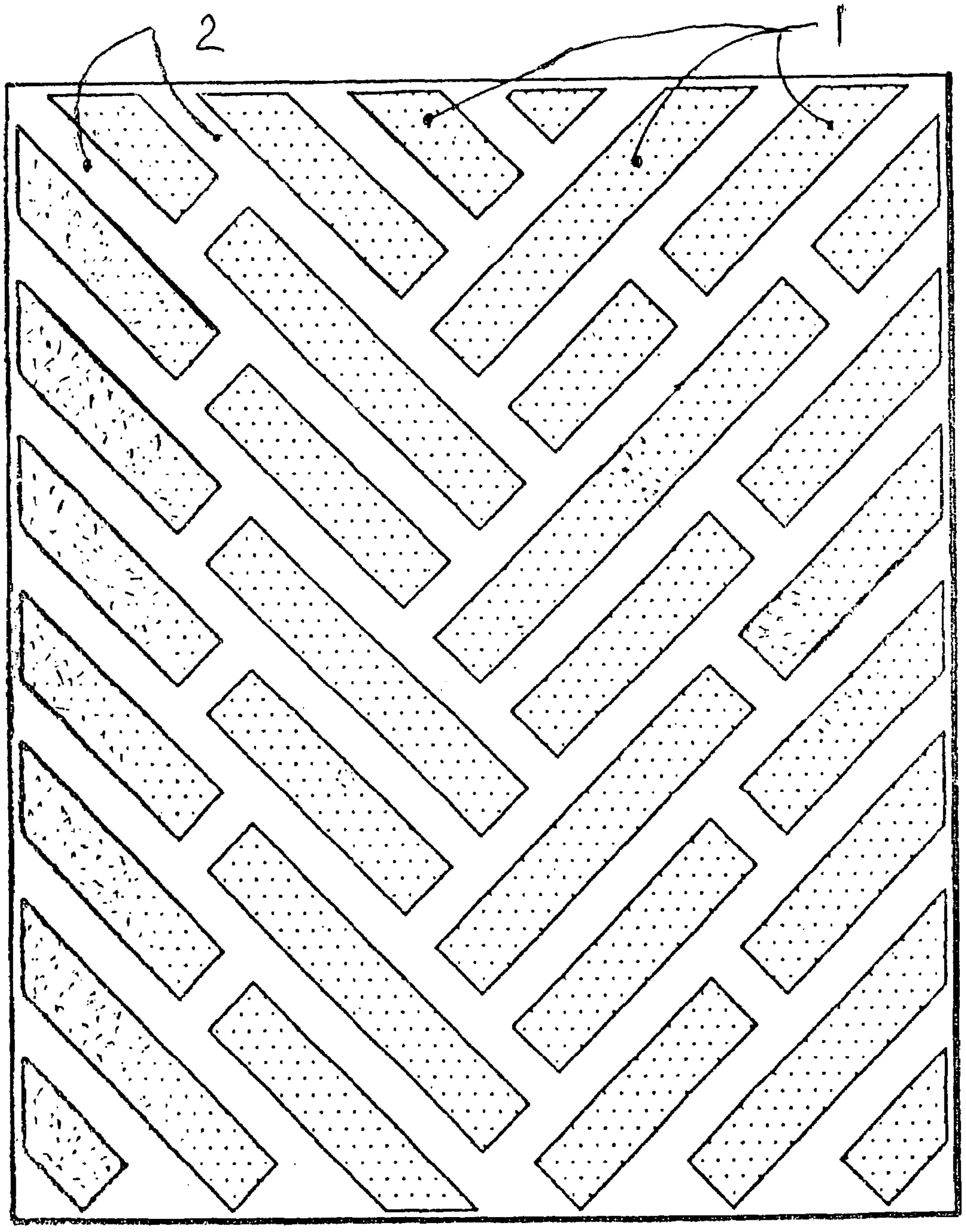

The wear resistant inserts can have a rectangular shape and located so that their longitudinal axes intersects one another for forming a chevron shape as shown in FIG. 8*i*.

Figure 8J:
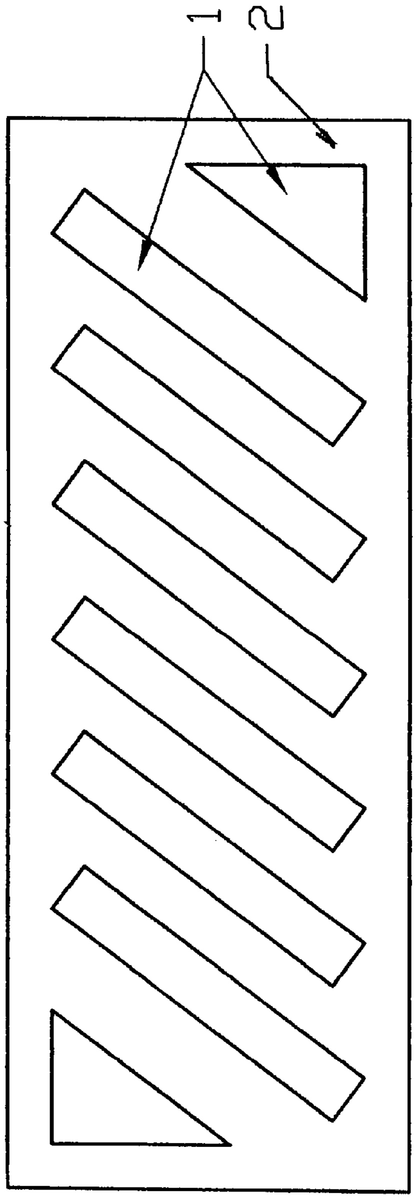

The inserts can have a rectangular shape and should be positioned with their side bases at a degree (relative to the movement of the abrasive material) of no less than 20°, which would prevent the wear of the ductile base of the composite castings as shown in FIG. 8*j*.

Figure 8K:
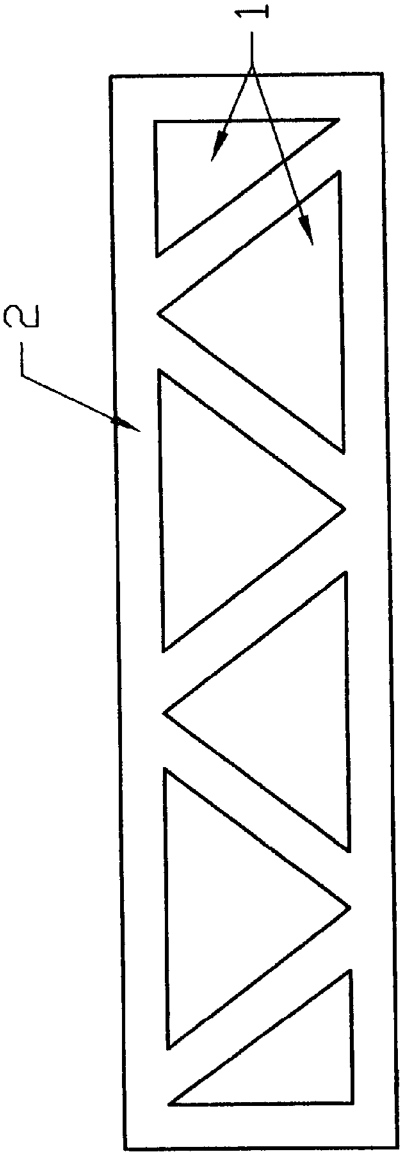

The inserts can also have a triangular shape and should be positioned with their side bases at a degree (relative to the movement of the abrasive material) of no less than 20°, which would prevent the wear of the ductile base of the composite castings as shown in FIG. 8*k*.

It will be understood that each of the elements described above, or two or more together, may also find a useful application in other types of constructions differing from the type described above.

While the invention has been illustrated and described as embodied in abrasion and impact resistant composite castings for working in condition of wear and high dynamic loads, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A composite casting for a wear resistant surface, comprising a base composed of a ductile material, and a plurality of wear resistant inserts composed from carbide-containing wear resistant hot rolled stock steel and embedded in said base, wherein said stock steel comprises 1.20-3.00% carbon, up to 1.00% silicon and manganese, 4-12.5% chromium, up to 5.00% molybdenum, up to 6.00% tungsten, and up to 10.00% vanadium, wherein said hot rolled stock steel is produced by hot rolling after casting.

2. The composite casting for a wear resistant surface of claim 1 wherein said stock steel comprises, 1.20-3.00% carbon, up to 1.00% silicon and manganese, 4.00-8.50% chromium, up to 5.00% molybdenum, up to 6.00% tungsten, up to 10.00% vanadium.

3. The composite casting for a wear resistant surface of claim 1, wherein said wear resistant inserts have a shape selected from the group consisting of a circle, a square, a rectangle, a triangle, and tri-petal clover in a plan view of the said wear resistant inserts.

4. The composite casting for a wear resistant surface of claim 1, wherein each of the said inserts have a rectangular shape and are positioned at a degree relative to the movement of the abrasive material of no less than 20 degrees, which would prevent the wear of the ductile base of the composite casting.

5. The composite casting for a wear resistant surface of claim 1, wherein each of said inserts have a triangular shape and are positioned at a degree relative to the movement of the abrasive material of no less than 20 degrees, which would prevent the wear of the ductile base of the composite casting.

6. The composite casting for a wear resistant surface of claim 1, wherein each of said wear resistant inserts has a side surface provided with a structure selected from the group consisting of a recess and a rib.

7. The composite casting for a wear resistant surface of claim 1, wherein each of said inserts is located in said base in rows such that said inserts of subsequent one of said rows overlaps gaps between said inserts of a preceding one of said rows.

8. The composite casting for a wear resistant surface of claim 1, wherein said base is composed of a low carbon steel.

9. The composite casting for a wear resistant surface of claim 1, wherein said base is composed of low carbon martensite steel with a hardness which after hot treatment is not less than 40 HRC.

10. The composite casting for a wear resistant surface of claim 1, wherein said base is composed of an austenite manganese steel which contains not more than 1.30% carbon, not more than 0.80% silicon, up to 14.00% manganese, up to 3.00% chromium, up to 0.70% vanadium, up to 1.50% molybdenum.

11. A method of producing composite casting for a wear resistant surface, the method comprising the steps:

producing by casting a billet for a plurality of wear resistant inserts made from carbide-containing wear-resistant stock steel, hot rolling the billet for producing the stock steel for said plurality of wear resistant inserts, dividing the hot rolled stock steel into plurality of said wear resistant inserts, positioning in a cast mold the plurality of said wear resistant inserts in a preselected pattern, and pouring a melted ductile alloy to the cast mold that composes a base of the composite casting, wherein the stock steel comprises 1.20-3.00% carbon, up to 1.00% silicon and manganese, 4-12.5% chromium, up to 5.00% molybdenum, up to 6.00% tungsten and up to 10.00% vanadium.

12. The method for producing composite casting for a wear resistant surface of claim 11, wherein said wear resistant alloy comprises 1.20-3.00% carbon, up to 1.00% silicon and manganese, 4.00-8.50% chromium, up to 5.00% molybdenum, up to 6.00% tungsten, up to 10.00% vanadium.

13. The method for producing composite casting for a wear resistant surface of claim 11, wherein said inserts are located in said base in rows such that said inserts of subsequent one of said rows overlaps gaps between said inserts of a preceding one of said rows.

14. The method for producing composite casting for a wear resistant surface of claim 11, wherein said wear resistant inserts have a shape selected from the group consisting of a circle, a square, a rectangle, a triangle, and tri-petal clover in a plan view of the said wear resistant inserts.

15. The method for producing composite casting for a wear resistant surface of claim 11, wherein each of the said inserts have a rectangular shape and is positioned at a degree relative to the movement of the abrasive material of no less than 20 degrees, which would prevent the wear of the base of the composite casting.

16. The method for producing composite casting for a wear resistant surface of claim 11 wherein each of said inserts have a triangular shape and is positioned at a degree relative to the movement of the abrasive material of no less than 20 degrees.

17. The method for producing composite casting for a wear resistant surface of claim 11, wherein each of said wear resistant inserts has a side surface provided with a structure selected from the group consisting of a recess and a rib.

18. The method for producing composite casting for a wear resistant surface of claim 11, wherein said base is composed of a low carbon steel.

19. The method for producing composite casting for a wear resistant surface of claim 11, wherein said base is composed of low carbon martensite steel with a hardness which after hot treatment is not less than 40 HRC.

20. The method for producing composite casting for a wear resistant surface of claim 11, wherein said base is composed of an austenite manganese steel which contains not more than 1.30% carbon, not more than 0.80% silicon, up to 14.00% manganese, up to 3.00% chromium 11.00%, up to 0.70% vanadium, up to 1.50% molybdenum.

* * * * *